(12) United States Patent
Strickler et al.

(10) Patent No.: US 6,838,178 B1
(45) Date of Patent: Jan. 4, 2005

(54) GLASS ARTICLE WITH ANTI-REFLECTIVE COATING

(75) Inventors: David A. Strickler, Toledo, OH (US);
Kevin Sanderson, Wigan (GB);
Srikanth Varanasi, Toledo, OH (US);
Ronald D. Goodman, Toledo, OH (US)

(73) Assignees: Libbey-Owens-Ford Co., Toledo, OH (US); Pilkington PLC, Merseyside (GB)

( * ) Notice: Subject to any disclaimer, the term of this patent is extended or adjusted under 35 U.S.C. 154(b) by 381 days.

(21) Appl. No.: 09/625,580

(22) Filed: Jul. 26, 2000

(51) Int. Cl.$^7$ .............................. B32B 17/06; B32B 7/02
(52) U.S. Cl. ...................... 428/432; 428/212; 428/336; 428/426; 428/216; 428/697; 428/699; 428/701; 428/702; 359/359; 359/580; 359/586
(58) Field of Search ................................ 428/212, 216, 428/336, 426, 432, 697, 699, 701, 702; 359/359, 580, 586

(56) References Cited

U.S. PATENT DOCUMENTS 6,124,026 A    9/2000  McCurdy et al.

FOREIGN PATENT DOCUMENTS

| EP | 0 708 063 A  | 4/1996 |
| EP | 07803461 A1  | 6/1997 |
| EP | 0983972 A2   | 3/2000 |
| GB | 2 324 098    | 10/1998 |

*Primary Examiner*—Deborah Jones
*Assistant Examiner*—Andrew T Piziali
(74) *Attorney, Agent, or Firm*—Marshall & Melhorn, LLC.

(57) ABSTRACT

A color neutral absorbing film is applied as a coating on a glass substrate, to which a conductive coating is first applied. An additional metal oxide layer is deposited on the absorbing film. The coating is suitable for use in anti-reflective coatings containing other metal oxides or mixed metal oxides to achieve a coated glass article having a visible light transmittance of 30% or greater and a reflectance of less than 5%. The coated glass article is absorbing, anti-reflective and conducting.

12 Claims, No Drawings

GLASS ARTICLE WITH ANTI-REFLECTIVE COATING

BACKGROUND OF THE INVENTION

This invention relates to a neutral absorbing film suitable for use as a coating on a glass substrate. More particularly, this invention relates to an energy absorbing and anti-reflective coated glass article.

Coatings on glass are commonly utilized to provide specific energy attenuation and light transmittance properties. Additionally, coatings are designed to reduce reflections from interfaces between individual coating layers and the glass when a plurality of coatings are applied onto a glass substrate. The coated articles are often utilized singularly, or in combination with other coated articles, to form a glazing.

The attributes of a coated glass substrate are dependent upon the specific coatings applied to the glass substrate. The coating compositions and thicknesses impart energy absorption and light transmittance properties within the coated article while also affecting the spectral properties. Desired attributes may be obtainable by adjusting the compositions or thicknesses of the coating layer or layers. However, adjustments to enhance a specific property can adversely impact other transmittance or spectral properties of the coated glass article. Obtaining desired spectral properties is often difficult when trying to combine specific energy absorption and light transmittance properties in a coated glass article.

Anti-reflective coatings on glass are utilized to reduce the surface reflection of optical components and to reduce the reflectance of an interface between optical media with different refractive indices. The reduction of visible reflection is achieved by the principle of optical interference. When light impinges on the air-film, film-film, and film-glass interfaces, a portion of the beam is reflected at each interface. By proper choice of thin film materials and thicknesses, the individual reflected light beams can destructively interfere thereby reducing the observed visual reflectance.

The utilization of a coating having absorption properties enables further reduction in reflection by absorbing the light as it travels through the high index absorbing film thereby reducing the light energy incident on the back glass interface and glass-film interface. The absorption of visible light results in the reduction of visible light transmitted through the glass. Generally, absorbing films are strongly colored and therefore do not result in a neutral transmittance or reflectance. The utilization of an energy absorbing film is preferred when the minimization of visible reflection is desired and a reduction of visible light transmittance is acceptable.

Absorbing films may also adversely impact the visible light transmittance to a level unacceptable for anti-reflective and solar control applications. For example, European Patent publication EP0780346 A1 discloses a method for producing tin oxide films doped with antimony oxide. The films are applied pyrolytically and result in a film having a molar ratio of tin to antimony of 1:0.2 to 1:0.5. The resulting films, when applied onto a neutral glass substrate at a thickness of about 50 nm to about 1,500 nm, result in a visible light transmittance of less than 10 percent. The color of the films are generally a dark, gray-violet color. Thus, the low visible light transmittance and spectral properties renders such films undesirable for anti-reflective glass applications.

International Patent Publication No. WO 9902336A (PCT/US98/13531) describes a non-conductive and energy absorbing coating of an antimony/tin oxide alloy. In WO 9902336A, the energy absorbing film, having a refractive index of about 1.8 to about 2.6, may be utilized with a metal oxide, having a lower refractive index, to form a coated glass article, the high refractive index film is applied closest to the glass with the low refractive index film functioning as an outer layer. The high/low stack reduces visible reflection to a level below five percent by the principle of optical interference. Additionally, the absorbing properties of the film enable a further reduction in visible reflection to a level below two percent. The thicknesses and optical characteristics of the coating stack may be adjusted to achieve a broad range of specified transmittance values. In a preferred embodiment of WO 9902336A, the coated glass article has a visible light transmittance (Ill C) of at least 30%. The reflection and transmittance of visible light are both aesthetically neutral in color.

It has thus been known for anti-reflective coating stacks to have an absorbing layer and a conductive layer overlaying the absorbing layer. A preferred application of such a coating stack has been in a screen of a cathode ray tube, for example a computer monitor. The anti-reflective film minimizes the glare reflected by the screen, and the conductive coating acts to dissipate static electricity.

It would be advantageous to provide a coated glass article having an energy absorbing film that is capable of still further reducing the visible reflection from the glass while permitting a visible light transmittance of at least 30 percent. The film should also provide a desirable neutral color in both transmittance and reflectance.

It would be advantageous to provide low reflected glare with contrast enhancement between the background and screen text of display screen, and further to provide means for dissipating a static charge for the display screen.

It would be a further advantage to provide a color neutral absorbing film that may be applied pyrolytically onto a glass substrate. A pyrolytic film enables the deposition of the film on-line, for example, in a float glass production process.

SUMMARY OF THE INVENTION

In accordance with the present invention, there is provided a stack of coatings on a glass substrate, including first a conductive coating, for example a layer of tin oxide doped with fluorine, and then an absorbing layer, for example a layer of tin oxide heavily doped with antimony or a tin oxide/antimony alloy. This is followed by an outer metal oxide coating, for example silica oxide. It has been found that such a stack yields a result surprisingly superior to that which was expected when the layers are applied as in the prior art, with the conductive coating applied after the non-conductive coating. By positioning the absorbing layer in a position away from the outer layer/air interface, improved absorption is achieved and front surface reflection is minimized. This arrangement can produce improved reflection resistance over known anti-reflective glass while maintaining the desired conductivity.

In the context of the present invention, the phrases tin/oxide antimony alloy and tin oxide heavily doped with antimony are both used to mean tin oxide with an antimony concentration of at least about 3 atomic percent.

The present invention provides a light transmittance which is tunable dependent on the antimony/tin oxide layer and which is uncoupled from the fluorine doped tin oxide layer so that a whole range of resistances and light transmittances can be achieved.

In accordance with the present invention, the color neutral energy absorbing layer is a layer of tin oxide heavily doped with antimony or a layer of an antimony/tin oxide alloy produced by combining an antimony source with conventional tin oxide deposition precursors. The amount of antimony present in the film is preferably about 3 to 10 atomic percent. Lower levels of antimony in the film layer can result in the layer becoming conductive. Additionally, the lower concentration may not be sufficiently absorbing for the intended use. The antimony/tin oxide alloy is preferably applied pyrolytically, on-line onto a float glass ribbon.

DETAILED DESCRIPTION OF THE PREFERRED EMBODIMENT

According to the present invention, it has been found that depositing a series of coatings on a glass substrate including a conductive layer followed by an absorbing coating, then an outer metal oxide coating, and also an optional barrier layer between the conductive layer and the glass substrate, yields a result surprisingly superior to that which was expected.

The glass substrates suitable for use in preparing the coated glass article according to the present invention may include any of the conventional clear glass compositions known in the art. The preferred substrate is a clear float glass ribbon wherein the coatings of the present invention, along with other optional coatings, are applied in the heated tone of the float glass process. However, other conventional processes for applying coatings on glass substrates are suitable for use with the present inventive coating. Additionally, colored glass compositions may be utilized with the films of the present invention to achieve specific spectral and energy attenuation properties.

A conductive coating is applied in an anti-reflective coating stack in conjunction with an anti-reflective layer. As opposed to heretofore proposed coating stacks of this type, the conductive coating of the present invention is applied nearer the glass substrate. The conductive coating enhances the utilization of the anti-reflective film by enabling the coated article to dissipate static charges that can build up, for example, on computer monitor screens. Preferably, the conductive coating is a conductive metal oxide, most preferably a 400–1400 Å layer of fluorine doped tin oxide. Other possible conventional conductive layers may be applied within the scope of the present invention. Such conductive metal oxide suitable for use with the invention include compounds selected from the group consisting of indium oxide doped with tin, indium oxide doped with fluorine, tin oxide doped with antimony (less than 3, and typically 1 to 2 atomic weight percent antimony), zinc oxide doped with aluminum, zinc oxide doped with fluorine, zinc oxide doped with boron, and tungsten oxide doped with fluorine. The conductive metal oxide is applied at a thickness of about 200 angstroms to about 5000 angstroms. Care must be taken with the thickness of this conductive coating. If this coating is too thin, it will be insufficiently conductive for the given purpose. If the conductive coating is too thick, it will cause too much reflectivity and will function counter to the purpose of the present invention. Thus, the conductive coating is preferably in the range of 400–1400 Å.

A non-conductive absorbing coating is applied over the conductive coating. This coating is preferably a tin oxide/antimony alloy or tin oxide heavily doped with antimony. Although an antimony/tin oxide layer is preferred other possible non-conductive anti-reflective metal oxide layers are possible within the scope of the invention. Preferably, the refractive index of this anti-reflective coating is in the range of about 1.8–2.6.

The preferred antimony tin oxide coating is a non-conductive, neutral, colored film suitable for deposition onto a glass substrate. The film is a mixed antimony/tin oxide alloy produced by including an amount of antimony of preferably about five atomic percent to about ten atomic percent in a tin oxide film.

The antimony/tin oxide alloy films enable the attenuation of light energy as it passes through the coated glass article. Energy applied to a coated glass article is either transmitted, reflected, or absorbed. The antimony/tin oxide alloy is an energy absorbing film which reduces the amount of light energy incident to the back glass-air interface and the glass film interface. Thus, the amount of reflected light is significantly reduced. The absorption of light results in the reduction of transmitted light through the glass.

The absorption properties of a coating or film are indicated by the extinction coefficient (k). Non-absorbing films have extinction coefficients of zero. Extinction coefficients for absorbing films are greater than 0.1, with higher values indicating greater energy absorption properties. The extinction coefficient for the heavily doped tin oxide or antimony/tin oxide alloy coating is preferably about 0.1 to about 0.3.

Additionally, the antimony/tin oxide alloy coating is a non-conductive film. Non-conductive films, as used herein, generally have a sheet resistance of greater than abort 500 ohms per square. Coatings with sheet resistance value less than 500 ohms per square are considered conductive coatings.

Typically, absorbing materials are strongly colored. Therefore, when applied to films they enable either a neutral color in transmittance or reflectance, but generally can not be adjusted to accomplish both. The coating preferred herein exhibits an aesthetically neutral color in both transmittance and reflectance. The color is preferably indicated by CIELAB color scale values of a* of about 6 to −9 and b* of about 6 to about −9.

For a pyrolytic deposition, the antimony/tin oxide alloy is deposited onto the glass substrate by incorporating an antimony source with conventional tin oxide precursors. An example would include the use of antimony trichloride in an organic solvent, which is vaporized and injected into a precursor gas stream containing dimethyltin diochloride, oxygen, and water in a helium carrier gas.

An additional anti-reflective layer is also preferably applied after the non-conductive layer. This layer is preferably a low refractive index metal oxide layer. The refractive index of this outer layer is preferably about 1.45 to 1.6. It is preferred that this layer is $SiO_2$.

In addition, a barrier layer may also optionally be applied to the glass prior to the application of the conductive coating. Barrier layers are utilized to prevent the migration of alkali metal ions from the glass substrate into the film. The migration of the alkali metal ions reduces the quality of the coated glass article and results in the undesirable appearance of haze in the article. Barrier layers may include coatings of silicon oxide, silicon oxycarbide, or aluminum oxide. A barrier layer is generally applied at about 100–200 angstroms thick. Preferably, a barrier layer or 100–200 Å $SiO_2$ is applied.

In an anti-reflective coating, the thickness of each layer is a function of the desired component stack and the preferred reflectivity. Thus, the thickness of each layer is selected based upon the refractive indices of each film utilized in the stack and the preferred level of reflectivity. One example of an anti-reflective coating would include the deposition of a barrier layer of about 200 angstroms of silicon oxide onto a 0.125 inch thick float glass ribbon. A layer of about 850 angstrom of fluorine doped tin oxide is applied over the barrier layer, followed by a layer of about 1000 angstroms of antimony/tin oxide. A layer of silicon oxide of about 800 angstroms thick is applied over the antimony/tin oxide alloy coating. The resulting article has a visible light transmittance of 41% and a reflectance of about 0.81%, with a sheet resistance of about 122 ohms/square.

In comparison to conventional anti-reflective coatings, the present invention significantly reduces the visible reflection and the visible light transmittance, while maintaining the necessary conductivity for anti-static purposes. A known anti-reflective coating would include an silicon oxide layer off about 203 angstroms thick on a 0.125 inch glass substrate. The known coating also contained a 1156 angstrom coating of antimony/tin oxide alloy, with an antimony content of 11 percent, applied over the silicon oxide layer and a 692 angstrom coating of silicon oxide over the antimony/tin oxide alloy. This known coated article exhibits a visible light transmittance (Ill C) of 52.3% and a visible reflection of 1.7%. The sheet resistance of the film was greater than 100,000 ohms per square. The present inventive coating has achieved a visible light transmittance of 41% and a reflection of 0.81%. A clear glass substrate without coatings will typically reflect over 8% of the visible light.

The anti-reflective coated glass article is ideally suited for use in computer screens where a high contrast and neutral transmittance are desirable with little visible light reflection from the screen. Additionally, the anti-reflective film is suitable for use in various architectural and automotive applications where high reflectivity is undesirable.

The following example, which constitutes the best mode presently contemplated by the inventors for practicing the present invention, is presented solely for the purpose of further illustrating and disclosing the present invention, and is not to be construed as a limitation on, the invention:

Example

A float glass process was used to produce a clear glass ribbon having a thickness of 0.125 inches. A conventional coating apparatus is utilized in the float bath to apply a 200 Å barrier layer of $SiO_2$ onto the surface of the clear glass substrate. the coating was applied by directing 12 standard liters per minute (slm) of ethylene, 8 slm of oxygen and 2 slm of silane in 535 slm of nitrogen carrier gas.

On this layer was applied an 850 Å layer of fluorine doped $SnO_2$. Approximately 9 lbs per hour of dimethyltin dichloride, 200 slm of oxygen, 4 slm of hydrogen fluoride gas, 9 slm of nitrogen and 50 cc per minute of water were provided in a 380 slm helium carrier gas.

A 1200 Å layer of antimony/tin oxide alloy was applied on this coating. Approximately 22 pounds per hour of dimethyl tin dichloride, 200 slm of oxygen, and 100 cc per minute of water were provided in a 280 slm helium carrier gas. About 25 cc per minute of antimony trichloride in solution was added to the precursor stream. The antimony trichloride solution contained about 30 mole percent antimony trichloride in ethyl acetate.

Finally, an 700 Å outer layer of $SiO_2$ was applied over the antimony/tin oxide layer. The outer layer was applied by two coaters each directing a precursor gas mixture containing 36 slm of ethylene, 24 slm of oxygen and 6 slm of silane in a 535 slm of a nitrogen carrier gas onto the coated glass ribbon.

This sample exhibited a sheet resistance of 122 ohms per square. Additionally, the sample exhibited a visible transmission of 41% and a reflectance (front surface only) of 0.81%.

Additional samples were produced under similar conditions. With slight variations to the process conditions, it was possible to obtain samples having the following characteristics: sheet resistance 122 ohms per square, visible transmission 40.4%, reflectance 0.83; sheet resistance 122 ohms per square, visible transmission 40.9%, reflectance 0.81; sheet resistance about 120 ohms per square, visible transmission 41.3%, reflectance 0.70; sheet resistance about 120 ohms per square, visible transmission 46.7%, reflectance 0.73; sheet resistance about 120 ohms per square, visible transmission 41.3%, reflectance 0.63; and sheet resistance about 120 ohms per square, visible transmission 48.9%, and reflectance 0.76.

In accordance with the provisions of the patent statutes, the present invention has been described in what as considered to represent its preferred embodiment. However, it should be noted that the invention can be practiced otherwise than as specifically illustrated and described without departing from its spirit or scope. For example, other coating methods, such as sputtering, may also be utilized to form the pyrolytic coating of the present invention.

What is claimed is:

1. An anti-reflective, absorbing, conductive coated glass article, having a film-side reflectance of less than 5%, comprising:
   (a) a glass substrate,
   (b) a coating of conductive metal oxide applied over said glass substrate,
   (c) an absorbing, non-conductive coating of an antimony/tin oxide alloy applied over said coating of conductive metal oxide,
   (d) an anti-reflective coating of a metal oxide applied over said coating of antimony/tin oxide alloy; and
   (e) a barrier layer applied between said glass substrate and said conductive metal oxide coating.

2. A glass article as recited in claim 1, wherein said antimony is present in the antimony/tin oxide alloy at levels of about 3 atomic percent or more.

3. A glass article as recited in claim 1, wherein said antimony is present in the antimony/tin oxide alloy at levels of about 3 atomic percent to about 10 atomic percent.

4. A glass article as recited in claim 1, wherein said coated article exhibits a reflectance of less than 2%.

5. A glass article as recited in claim 4, wherein said coated article exhibits a reflectance of less than 1%.

6. A glass article as recited in claim 1, wherein said article has a visible light transmittance (Ill C) of about 30% or greater.

7. A glass article as recited in claim 1, wherein said anti-reflective coating is $SiO_2$.

8. A glass article as recited in claim 1, wherein said glass substrate is float glass ribbon and said coatings are deposited pyrolytically onto said float glass ribbon.

9. A glass article as recited it claim 1, wherein said antimony/tin oxide alloy is applied at a thickness of about 500 angstroms to about 2500 angstroms, and said anti-reflective coating is applied at a thickness of about 650 angstroms to about 1100 angstroms.

10. A glass article as recited in claim 1, wherein said conductive metal oxide is selected from the group consisting of indium oxide doped with tin, indium oxide doped with fluorine, tin oxide doped with fluorine, tin oxide doped with antimony, zinc oxide doped with aluminum, zinc oxide doped with fluorine, zinc oxide doped with boron, and tungsten oxide doped with fluorine.

11. A glass article as recited in clam 1, wherein said conductive metal oxide is applied at a thickness of about 200 angstroms to about 5000 angstroms.

12. A glass article as recited in claim 1, wherein said antimony tin oxide alloy has an extinction co-efficient of about 0.1 to about 0.3.

* * * * *